United States Patent
Obrecht et al.

(10) Patent No.: US 6,797,780 B2
(45) Date of Patent: Sep. 28, 2004

(54) MICROGEL-CONTAINING RUBBER COMPOUNDS WITH PHOSPHORYL POLYSULFIDES AND VULCANIZATES OR SHAPED ARTICLES PREPARED THEREFROM

(75) Inventors: Werner Obrecht, Moers (DE);
Winfried Jeske, Burscheid (DE);
Thomas Früh, Ludwigshafen (DE);
Ludger Heiliger, Neustadt (DE)

(73) Assignee: Rhein Chemie Rheinau GmbH, Monheim (DE)

( * ) Notice: Subject to any disclaimer, the term of this patent is extended or adjusted under 35 U.S.C. 154(b) by 0 days.

(21) Appl. No.: 10/033,247

(22) Filed: Oct. 29, 2001

(65) Prior Publication Data

US 2002/0082364 A1 Jun. 27, 2002

(30) Foreign Application Priority Data

Nov. 3, 2000 (DE) .......................... 100 54 533

(51) Int. Cl.$^7$ .................... C08K 5/5398; C08L 7/00; C08L 9/00; C08L 11/00
(52) U.S. Cl. .................... 525/194; 525/188; 525/189; 525/195; 525/341
(58) Field of Search .................... 525/188, 189, 525/194, 195, 341

(56) References Cited

U.S. PATENT DOCUMENTS

| | | | |
|---|---|---|---|
| 2,187,146 A | 1/1940 | Calcott et al. | 18/57 |
| 5,124,408 A | 6/1992 | Engels et al. | 525/215 |
| 5,395,891 A | 3/1995 | Obrecht et al. | 525/194 |
| 5,717,038 A | 2/1998 | Hörpel et al. | 525/332.4 |
| 6,127,488 A | 10/2000 | Obrecht et al. | 525/333.3 |
| 6,184,296 B1 | 2/2001 | Obrecht et al. | 525/232 |
| 6,207,757 B1 | 3/2001 | Obrecht et al. | 525/194 |

FOREIGN PATENT DOCUMENTS

| | | |
|---|---|---|
| CA | 2298498 | 8/2000 |
| DE | 199 19 459 | 11/2000 |
| DE | 199 39 865 | 3/2001 |
| EP | 0 432 405 | 6/1991 |
| EP | 0 767 205 | 9/1996 |
| EP | 0854171 | * 7/1998 |
| GB | 1078400 | 8/1967 |

OTHER PUBLICATIONS

Product data sheet from Rhein Chemie Rheinau GmbH Rhenocure® SDT/S "Konfektionierte Kautschuchemikalien und Additive" (date unavailable), pp. 1 and 2.

* cited by examiner

Primary Examiner—Patricia A. Short
(74) Attorney, Agent, or Firm—Jennifer R. Seng

(57) ABSTRACT

The invention relates to rubber compounds based on rubber particles and phosphoryl polysulfides, as well as to vulcanizates or shaped articles prepared therefrom. The addition of phosphoryl polysulfides improves the strengthening effect of the rubber particles and the level of the mechanical properties, without lowering the resilience of the vulcanizates prepared therefrom.

7 Claims, No Drawings

MICROGEL-CONTAINING RUBBER COMPOUNDS WITH PHOSPHORYL POLYSULFIDES AND VULCANIZATES OR SHAPED ARTICLES PREPARED THEREFROM

FIELD OF THE INVENTION

The invention relates to rubber compounds based on rubber particles and phosphoryl polysulfides, as well as to vulcanizates or shaped articles prepared therefrom. The addition of phosphoryl polysulfides improves the strengthening effect of the rubber particles, in particular, the product $S_{300} \times D$ of the modulus at 300% elongation ($S_{300}$) and the elongation at break (D), without lowering the resilience of the vulcanizates prepared therefrom.

BACKGROUND OF THE INVENTION

Fillers are used to improve the mechanical properties of vulcanized rubber articles. Those with the greatest industrial importance are carbon blacks and silicas. The use of fillers provides higher vulcanizate hardnesses, higher moduli and higher strengths than in the case of the corresponding unfilled vulcanizates. According to the strengthening effect of the fillers, distinction is made between inactive, active and highly active fillers. Especially in the case of inorganic fillers, their high density (carbon black: 1.8 g/cm³; silica: 2.1 g/cm³) leads to a compromise in terms of the weight of the rubber article prepared therefrom.

The use of microgels as filler is described in the following patent applications, or patents: EP-A 405 216, DE-A 4 220 563, GB-PS 1 078 400, DE-A 197 01 489, EP-A 432 405 and EP-A 432 417. The use of CR, BR and NR microgels in compounds with rubbers that contain double bonds is claimed in patent (applications) EP-A 405 216, DE-A 4 220 563 and in GB-PS 1 078 400. The resilience of the filled vulcanizates, especially at 70° C., is advantageous. The strengthening effect of the microgels (modulus) is not sufficient for industrial use. This is demonstrated, in particular, by the fact that large amounts of gel need to be used in order to obtain industrially suitable modulus ranges. These large amounts of gel lead to overfilling of the compounds, so that the elongations at break are reduced. There is, therefore, an industrial need, in the case of gel-filled vulcanizates, to find ways of increasing the product of the modulus at 300% elongation ($S_{300}$) and the elongation at break (D), without simultaneously compromising the resilience at 70° C.

The use of phosphoryl polysulfides in rubber compounds is disclosed by the product data sheet from Rhein Chemie Rheinau GmbH Rhenocure® SDT/S "Konfektionierte Kautschukchemikalien und Additive" [manufactured rubber chemicals and additives] 09.99 edition. The purpose of the phosphoryl polysulfides is to provide non-discoloring sulfur donors for the vulcanization of natural and synthetic rubber. Phosphoryl polysulfides act as sulfur donors which lead to monosulfide and disulfide crosslinking bridges with good reversion stability during vulcanization and in vulcanized articles. The product data sheet does not, however, teach the use of phosphoryl polysulfides to improve the strengthening effect of gel-filled vulcanizates.

SUMMARY OF THE INVENTION

It has now been found that, by adding phosphoryl polysulfides to rubber compounds which contain rubber gels, both the modulus at 300% elongation and the product of $S_{300}$ and the elongation at break ($S_{300} \times D$) are improved without lowering the resilience at 70° C.

DETAILED DESCRIPTION OF THE INVENTION

Therefore, the present invention provides rubber compounds made up of at least one rubber that contains double bonds (A), at least one rubber gel (B) and at least one phosphoryl polysulfide (C), wherein the proportion of rubber that contains double bonds (A) is 100 parts by weight, the proportion of rubber gel (B) is from 5 to 150 parts by weight and the proportion of phosphoryl polysulfide (C) is from 0.1 to 10 parts by weight, and optionally other fillers and rubber auxiliary substances.

Preferably, the proportion of rubber gel (B) in the compounds is from 20 to 100 parts by weight and the proportion of phosphoryl polysulfide (C) is from 0.5 to 7 parts by weight.

The term "rubber that contains double bonds" means the rubbers which are classified as R rubbers according to DIN/ISO 1629. These rubbers have double bonding in the main chain. Examples include:

| | |
|---|---|
| NR: | natural rubber |
| SBR: | styrene/butadiene rubber |
| SIBR: | styrene/isoprene/butadiene rubber |
| SNBR: | styrene/acrylonitrile/butadiene rubber |
| BR: | polybutadiene rubber |
| NBR: | nitrile rubber |
| IIR: | butyl rubber |
| HNBR: | hydrogenated nitrile rubber |
| SNBR: | styrene/butadiene/acrylonitrile rubber |
| CR: | polychloroprene |

The term "rubbers that contain double bonds" should, however, also be understood as meaning rubbers which are M rubbers according to DIN/ISO 1629 and, besides the saturated main chain, have double bonding in side chains. Examples include EPDM.

The term "rubber particles (B)" means rubber gels, also referred to as microgels or just gels, which are obtained by crosslinking the following rubbers:

| | |
|---|---|
| BR: | polybutadiene, |
| ABR: | butadiene/C1-4 alkyl acrylate copolymers, |
| IR: | polyisoprene, |
| SBR: | styrene butadiene copolymers with styrene contents of 1–60, preferably 2–50 wt. %, |
| X-SBR: | carboxylated styrene butadiene copolymers, |
| FKM: | fluorinated rubber, |
| ACM: | acrylate rubber, |
| NBR: | polybutadiene/acrylonitrile copolymers with acrylonitrile contents of 5–60, preferably 10–50 wt. %, |
| X-NBR: | carboxylated nitrile rubbers, |
| CR: | polychloroprene, |
| IIR: | isobutylene/isoprene copolymers with isoprene contents of from 0.5 to 10 wt. %, |
| BIIR: | brominated isobutylene/isoprene copolymers with bromine contents of 0.1–10 wt. %, |
| CIIR: | chlorinated isobutylene/isoprene copolymers with chlorine contents of 0.1–10 wt. %, |
| HNBR: | partially and fully hydrogenated nitrile rubbers, |
| EPDM: | ethylene propylene diene copolymers, |
| EAM: | ethylene/acrylate copolymers, |
| EVM: | ethylene/vinyl acetate copolymers, |
| ECO: | epichlorohydrin rubber, |
| Q: | silicone rubbers, |
| AU: | polyester urethane polymers |
| EU: | polyether urethane polymers |
| ENR: | epoxidized natural rubber or compounds thereof. |

The following are preferred: CR, NR, NBR, BR and SBR gels. The microgels have particle diameters of 5–1000 nm, preferably 20–600 nm (DVN value according to DIN 53 206). Because of their crosslinking, they are insoluble and can swell in suitable swelling agents, e.g. toluene. The swelling index of the microgels ($Q_i$) in toluene is 1–15, preferably 1–10.

The swelling index is calculated from the weight of the solvent-containing gel (after centrifuging at 20,000 rpm) and the weight of the dry gel:

$Q_i$=(wet weight of the gel)/(dry weight of the gel).

To determine the swelling index, 250 mg of gel are allowed to swell in 25 ml of toluene for 24 hours while shaking. The gel is centrifuged off and weighed, then dried to constant weight at 70° C. and re-weighed.

The preparation of the crosslinked rubber particles (rubber gels) to be used from the basic rubbers of the aforementioned type is known in principle and is described, for example in U.S. Pat. No. 5,395,891 and EP-A 981 000 49.0.

Furthermore, it is possible to increase the particle sizes of the rubber particles by aggregation. The preparation of silica/rubber hybrid gels by co-aggregation is also described, for example, in German Patent Application No 199 39 865.8.

Of course, the crosslinked rubber particles may also be modified with suitable functional groups.

The modification of the crosslinked rubber particles (rubber gels) and the addition of the aforementioned functional groups is, likewise, known to the person skilled in the art and is described, for example, in German Patent Applications No 199 19 459.9, 199 29 347.3 and 198 34 804.5.

The phosphoryl polysulfides (C) are derived from the following two basic substances:

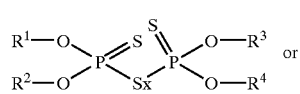

(I)

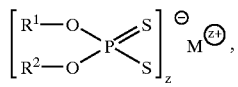

(II)

in which

R¹, R², R³ and R⁴ are identical or different and stand for aliphatic, heteroaliphatic, aromatic and heteroaromatic substituents with from 1 to 24, preferably from 1 to 18 C atoms, and from 1 to 4 heteroatoms such as N, S and O, x stands for integers from 1 to 8, preferably from 3 to 6, z stands for integers from 1 to 3, preferably from 1 to 2, and $M^{z+}$ denotes a metal cation with charge $z^+$, where $z^+$ is from 1 to 3, preferably 1 or 2.

The following metals are suitable:

Li, Na, K, Rb, Cs, Be, Mg, Ca, Sr, Ba, Al, Nd, Zn, Cd, Ni and Cu.

The following are preferred: Na, K, Zn and Cu.

The following phosphoryl polysulfides are particularly advantageous:

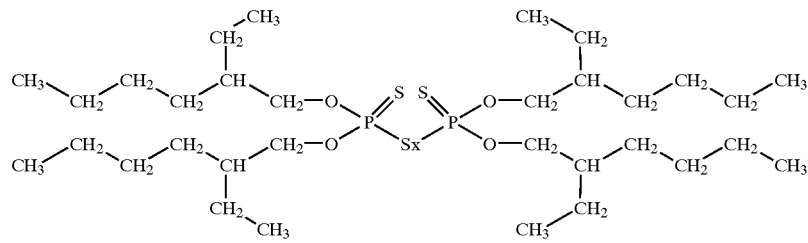

with x=from 2 to 4

(This chemical is commercially available as Rhenocure® SDT/G bound to 30 wt. % of highly active silica from Rheinchemie).

and

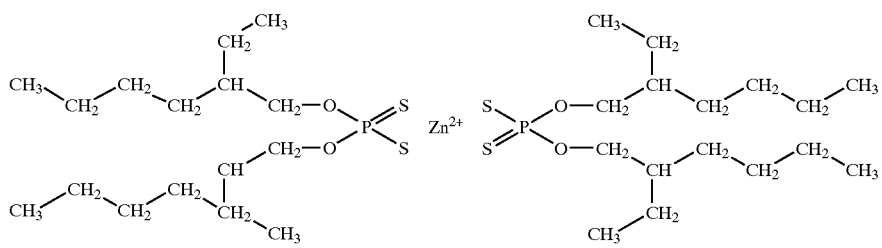

(This chemical is commercially available as Rhenocure® ZDT/G bound to 30 wt. % of highly active silica and 20 wt. % of polymer binder from Rheinchemie).

The rubber compounds according to the present invention, made up of rubber that contains double bonds (A), rubber gel (B) and phosphoryl polysulfides (C), may also contain other components such as fillers:

The following fillers are particularly suitable for the preparation of the rubber compounds and vulcanizates according to the present invention:

carbon blacks. The carbon blacks to be used in this case are prepared by the lampblack, furnace or gas black methods and have BET surfaces of 20–200 m$^2$/g, for example SAF, ISAF, IISAF, HAF, FEF or GPF blacks.

highly dispersed silicas, prepared e.g. by precipitation from solutions of silicates or flame hydrolysis of silicon halides with specific surfaces of 5–1000, preferably 20–400 m$^2$/g (BET surface) and primary particle sizes of 5–400 nm. The silicas may also optionally be in the form of mixed oxides with other metal oxides, for example Al, Mg, Ca, Ba, Zn and Ti oxides.

synthetic silicates, such as aluminum silicate, alkaline-earth metal silicate, such as magnesium silicate or calcium silicate with BET surfaces of 20–400 m2/g and primary particle diameters of 5–400 nm.

natural silicates, such as kaolin and other naturally occurring silicas.

metal oxides, such as zinc oxide, calcium oxide, magnesium oxide and aluminum oxide.

metal carbonates, such as calcium carbonate, magnesium carbonate and zinc carbonate.

metal sulfates, such as calcium sulfate and barium sulfate.

metal hydroxides, such as aluminum hydroxide and magnesium hydroxide.

glass fibers and glass-fiber products (rods, yarns or glass microbeads).

thermoplastic fibers (polyamide, polyester, aramid).

thermoplastic fillers, such as polyethylene, polypropylene, polytetrafluoroethylene, syndiotactic 1,2-polybutadiene, trans-1,4-polybutadiene, syndiotactic polystyrene and polycarbonate.

The fillers may be used individually or as a mixture. In a preferred embodiment of the method, 10–100 parts by weight of rubber gel (B), optionally together with 0.1–100 parts by weight of carbon black and/or 0.1–100 parts by weight of light-colored fillers are used, in each case expressed per 100 parts by weight of uncrosslinked rubber.

The rubber compounds according to the present invention may contain other rubber auxiliary substances, e.g. crosslinking agents, reaction promoters, antioxidants, heat stabilizers, light stabilizers, antiozonants, processing agents, plasticizers, tacking agents, blowing agents, dyes, pigments, waxes, extenders, organic acids, retarding agents, metal oxides, as well as filler activators, for example triethanolamine, polyethylene glycol, hexantriol, bis (triethoxysilylpropyl)tetrasulfide or others which are known in the rubber industry.

The rubber auxiliary substances are used in the customary amounts, which are dictated inter alia by the task in hand. The customary amounts are e.g. amounts of 0.1–50 wt. %, expressed in terms of the amounts of rubber (A) used.

As customary crosslinking agents, it is possible to use sulfur, sulfur donors, peroxides or curing agents, for example diisopropenylbenzene, divinylbenzene, divinyl ether, divinylsulfone, diallyl phthalate, triallyl cyanurate, triallyl isocyanurate, 1,2-polybutadiene, N,N'-m-phenylene maleimide and/or triallyl trimellitate. Also suitable are the acrylates and methacrylates of polyvalent, preferably from 2 to 4-valent C$_2$ to C$_{10}$ alcohols, such as ethylene glycol, 1,2-propandiol, butandiol, hexandiol, polyethylene glycol with from 2 to 20, preferably from 2 to 8 oxyethylene units, neopentyl glycol, bisphenol-A, glycerol, trimethylpropane, pentaerythritol, sorbitol with unsaturated polyesters of aliphatic diols and polyols as well as maleic acid, fumaric acid and/or itaconic acid.

Furthermore, the rubber compounds according to the present invention may contain vulcanization accelerators. Examples of suitable vulcanization accelerators include mercaptobenzothiazoles, -sulfen-amides, guanidines, thiurams, dithiocarbamates, thioureas and thiocarbonates. Mercaptobenzothiazylsulfenamides and guanidines are preferred. The vulcanization accelerators, sulfur and sulfur donors or peroxides, or other curing agents, for example dimeric toluene-2,4-diisocyanate (=Desmodur TT) or 1,4-bis-1-ethoxyhydroquinone (crosslinking agent 30/10), are used in amounts of 0.1–40 wt. %, preferably 0.1–10 wt. %, expressed in terms of the total amount of rubber used. Sulfur is preferably used.

The vulcanization of the rubber compounds according to the present invention can be carried out at temperatures of 100–250° C., preferably 130–180° C., optionally under a pressure of 10–200 bar.

The rubber compounds according to the present invention, made up of unsaturated rubber (A), rubber gel (B) and phosphoryl polysulfides (C), can be prepared in a variety of ways:

On the one hand, it is of course possible to mix the solid individual components. Examples of machines suitable for this include rollers, closed mixers or mixing extruders. On the other hand, mixing by combining the latices of the uncrosslinked, or even of the crosslinked rubbers is possible. Isolation of the compound according to the present invention prepared in this way can be carried out as is customary, by evaporation, precipitation or freeze-coagulation (cf. U.S. Pat. No. 2,187,146). By mixing fillers into the latex mixture and subsequent processing, the compounds according to the present invention can be obtained directly as a rubber/filler formulation. The further blending of the rubber compound, made up of rubber that contains double bonds (A), rubber gel (B) and phosphoryl polysulfides (C), with additional fillers and optionally rubber auxiliary substances can be carried out in customary mixing machines, rollers, closed mixers or mixing extruders. Preferred mixing temperatures are 50–180° C.

The rubber compounds according to the present invention are suitable for the preparation of vulcanizates, especially shaped rubber articles of all types, such as cable coatings, hoses, transmission belts, conveyor belts, roller coatings, tires, preferably tire treads, shoe soles, O-rings and damping elements as well as diaphragms.

EXAMPLES

Preparation of the SBR gel/NR master batch (KA 8650/19)

To prepare the SBR gel/NR master batch, the SBR microgel-containing latex is first prepared separately, then it is mixed with NR latex and the mixture of the two latices is coagulated.

The SBR gel is prepared from Baystal 1357 from Polymer Latex GmbH (formerly: Bayer France, Port Jérôme) by crosslinking with dicumyl peroxide. Baystal 1357 is a non-carboxylated SBR latex with a styrene content of 22 wt. % and a solids content of 38 wt. %. The gel content is 75 wt. % and the swelling index of the gelled component is 61 (wet weight/dry weight in toluene). The latex particles have a diameter of $d_{10}$=50 nm, $d_{50}$=56 nm and $d_{80}$=60 nm. The density of the latex particles is 0.9281 g/cm$^3$. The glass transition temperature of the SBR is −57° C.

1a) Crosslinking of the SBR rubber present in latex form

For the crosslinking with dicumyl peroxide (DCP), the latex is diluted to a solids concentration of 30 wt. % and introduced into an autoclave. DCP is added in solid form at room temperature (1.5 phr expressed in terms of solid product). The DCP is melted by heating the latex to 60° C., and is distributed well in the latex by stirring. To remove oxygen, the reactor content is evacuated at 60° C. while stirring and nitrogen is applied under pressure. The evacuation/N2 application cycle is repeated 3 times. The reactor is then heated to 150° C. In order to prevent latex from baking on during heating, care is taken that the difference between the wall and internal temperatures does not exceed 10° C. After heating, the internal temperature is maintained for 45 minutes at least 150° C. The latex is then cooled and filtered through a Monodur cloth.

The further crosslinking with DCP does not substantially affect the particle size of the latex; the gel content increases to 97.5% and the density to 0.9717 g/cm$^3$; the swelling index decreases to 5.4% and the glass transition temperature rises to −26.5° C.

1b) Processing of the SBR microgel as the NR master batch

In order to ensure good distribution of the microgels in the future rubber matrix, the microgel latex is processed as an NR master batch, an NR/microgel weight ratio of 50/50 being set. Taytex with a solids concentration of 61 wt. % (importer: Theodor Durrieu, Hamburg) is used as NR master batch component.

Before mixing the two latices, the NR latex is laced by adding 5 wt. %, expressed in terms of NR, of 5% strength Dresinate 731 solution (sodium salt of disproportionated abietic acid from Hercules). The NR and carboxylated gel latices are then mixed for 10 minutes with intensive stirring at room temperature.

After the latex mixture has been prepared, an antioxidant dispersion is added. To that end, a 10% strength aqueous dispersion of an aminic antioxidant is used. To stabilize 1 kg of solid product, the following are used: 50 g of a dispersion of Vulcanox 4020 (N-isopropyl-N'-phenyl-p-phenylenediamine/Bayer AG), 0.0913 g of NaOH and 0.45 g of emulsifier T 11 (partially hydrogenated tallow fatty acid/Procter & Gamble) and 0.193 g of Oulu GP 331 (unmodified oleoresin/Veitsiluto, Oulu).

For coagulation, the stabilized latex mixture is stirred at room temperature into an electrolyte solution, the following being provided to coagulate 1 kg of solid product:
Electrolyte solution made up of 11 l of water, 150 g of sodium chloride; 48 g of Al sulfate. 18 water of crystallization; 100 g of Superfloc (1% strength).

The rubber crumb is washed a total of three times until it is free of chloride, by filtering it off, forming a slurry with approximately 15 l of Lewatite water and heating it to 95° C. while stirring. The rubber crumb is then dried to constant weight (approximately 60 hours) at 70° C. in a vacuum oven.

1c) Compound preparation vulcanization and results

On the basis of the aforementioned NR master batch of the SBR gel, the following compound series is prepared and the properties of the corresponding vulcanizates are determined:

Compound Series

It is shown that, by adding phosphoryl polysulfides to gel-containing compounds, the product $S_{300} \times D$ of the modulus at 300% elongation ($S_{300}$) and the elongation at break (D) is improved. The resiliences are not reduced by these additives.

Compound Series

Different compounds based on the SBR/NR master batch are prepared according to the following formulation in a closed laboratory mixer (data in each case expressed per 100 parts by weight of rubber/phr). The compound components are mixed in the sequence indicated in the table:

TABLE 1

| Compound No: | 1 | 2 | 3 | 4 | 5 |
|---|---|---|---|---|---|
| TSR 5, Defo 700[1] | 25 | 25 | 25 | 100 | 50 |
| NR master batch with 50 wt. % of SBR microgel | 150 | 150 | 150 | 0 | 100 |
| Carbon black N121 | 0 | 0 | 0 | 25 | 25 |
| Antiozonant wax[2] | 1.5 | 1.5 | 1.5 | 1.5 | 1.5 |
| Stearic acid | 3 | 3 | 3 | 3 | 3 |
| Zinc oxide | 3 | 3 | 3 | 3 | 3 |
| IPPD[3] | 1 | 1 | 1 | 1 | 1 |
| TMQ[4] | 1 | 1 | 1 | 1 | 1 |
| Sulfur | 1.6 | 1.6 | 1.6 | 1.6 | 1.6 |
| TBBS[5] | 1 | 2 | 1 | 1 | 1 |
| Zinc phosphoryl polysulfide[6] | 0 | 4 | 2 | 4 | 4 |
| phosphoryl polysulfide[7] | 0 | 0 | 2.3 | 0 | 0 |

[1]TSR 5, Defo 700 (masticated natural rubber with Defo hardness 700)
[2]Antilux L ® from Rheinchemie
[3]N-isopropyl-N'-phenyl-p-phenylenediamine (Vulcanox ® 4010 from Bayer AG)
[4]2,2,4-trimethyl-1,2-dihydroquinoline/polym. (Vulcanox ® HS from Bayer AG)
[5]N-tert.butyl-2-benzothiazylsulfenamide (Vulkacit NZ from Bayer AG)
[6]zinc bis(O,O-2-ethylhexyl)dithiophosphate (Rhenocure ® ZDT/G/50% strength)
[7]bis(O,O-2-ethylhexylthiophosphoryl)polysulfide (Rhenocure ® SDT/G/50% strength)

Characteristic properties of compounds 1)-5) are collated in the following table:

TABLE 2

| Compound No: | 1 | 2 | 3 | 4 | 5 |
|---|---|---|---|---|---|
| Compound viscosity/ML 1 + 4 [ME] | 59.7 | 53.5 | 49.9 | 55 | 60.5 |
| Mooney relaxation/MR30 [%] | 7.0 | 4.8 | 3.2 | 5.9 | 6.3 |

Characteristic vulcanization times, for example $t_{10}$, $t_{50}$, $t_{90}$, $t_{95}$ and characteristic torques such as $S_{max}$ and $S_{min}$ are determined in a rheometer experiment at 160° C. using a Monsanto Rheometer 100.

TABLE 3

| Compound No: | 1 | 2 | 3 | 4 | 5 |
|---|---|---|---|---|---|
| ts01 [min] | 4.8 | 3.2 | 2.8 | 1.7 | 1.9 |
| t10 [min] | 5 | 3.3 | 3 | 1.9 | 2.1 |
| t50 [min] | 7.7 | 4.4 | 4.2 | 2.5 | 2.8 |
| t90 [min] | 11.5 | 7.1 | 6.7 | 4.6 | 5 |
| t95 [min] | 13.4 | 8.6 | 8.2 | 5.3 | 6.1 |
| Smax. [Nm] | 13.7 | 14.5 | 15.6 | 17.3 | 19.0 |
| Smin. [Nm] | 3.0 | 2.8 | 2.6 | 3.2 | 3.0 |

The compounds are vulcanized for 9 minutes at 160° C. in a press.
The following test results are obtained:

TABLE 4

| Compound No: | 1 | 2 | 3 | 4 | 5 |
|---|---|---|---|---|---|
| Tensile strength [MPa] | 18.9 | 19.0 | 18.5 | 18.2 | 20.8 |
| elongation at break (D) [%] | 485 | 465 | 430 | 510 | 400 |
| modulus at 100% elongation ($S_{100}$) [MPa] | 1.8 | 1.7 | 2.0 | 1.9 | 2.6 |
| modulus at 300% elongation ($S_{300}$) [MPa] | 7.5 | 8.4 | 9.7 | 11.5 | 13.6 |
| Shore A hardness, 23° C. | 61 | 61 | 62 | 63 | 67 |
| Shore A hardness, 70° C. | 54 | 54 | 56 | 58 | 61 |
| Resilience, 23° C. [%] | 35 | 37 | 38 | 35 | 36 |

TABLE 4-continued

| Compound No: | 1 | 2 | 3 | 4 | 5 |
|---|---|---|---|---|---|
| Resilience, 70° C. [%] | 60 | 63 | 65 | 59 | 60 |
| Abrasion 40th emery [mm³] | 225 | 240 | 275 | 218 | 210 |
| Abrasion 60th emery [mm³] | 140 | 155 | 130 | 142 | 135 |
| $S_{300} \times D$ | 3638 | 3906 | 4171 | 5865 | 5440 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber compounds comprising at least one rubber that contains double bonds (A), at least one rubber gel (B) and at least one phosphoryl polysulfide (C) which is selected from phosphoryl polysulfides of the formula (I)

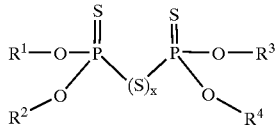

(I)

in which $R^1$, $R^2$, $R^3$, $R^4$ are identical or different and stand for aliphatic, heteroaliphatic, aromatic and heteroaromatic substituents with from 1 to 24 C atoms, and from 1 to 4 heteroatoms, and x stand for integers of 1 to 8, and
  wherein the proportion of rubber that contains double bonds (A) is 100 parts by weight, the proportion of rubber gel (B) is from 5 to 150 parts by weight and the proportion of phosphoryl polysulfide (C) is from 0.1 to 10 parts by weight, and optionally other fillers and rubber auxiliary substances.

2. Compounds according to claim 1, wherein the rubber gel comprises rubber based on CR, NR, NBR, BR and SBR.

3. Compounds according to claim 1, wherein said phosphoryl polysulfide is bis(O,O-2-ethylhexylthiophosphoryl) polysulfide.

4. Rubber vulcanizates comprising rubber compounds comprising at least one rubber that contains double bonds (A), at least one rubber gel (B) and at least one phosphoryl polysulfide (C), which is selected from phosphoryl polysulfides of the formula (I)

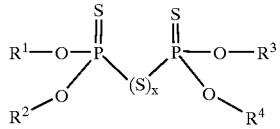

(I)

in which $R^1$, $R^2$, $R^3$, $R^4$ are identical or different and stand for aliphatic, heteroaliphatic, aromatic and heteroaromatic substituents with from 1 to 24 C atoms, and from 1 to 4 heteroatoms, and x stand for integers of 1 to 8, and wherein the proportion of rubber that contains double bonds (A) is 100 parts by weight, the proportion of rubber gel (B) is from 5 to 150 parts by weight and the proportion of phosphoryl polysulfide (C) is from 0.1 to 10 parts by weight, and optionally other fillers and rubber auxiliary substances.

5. Rubber vulcanizates according to claim 4, wherein the rubber gel comprises rubber based on CR, NR, NBR, BR and SBR.

6. Rubber vulcanizates according to claim 4, wherein said phosphoryl polysulfide is bis(O,O-2-ethylhexylthiophosphoryl)polysulfide.

7. Rubber vulcanizates according to claim 4, wherein said vulcanizate is a rubber article.

* * * * *